United States Patent
Suh et al.

(10) Patent No.: US 10,931,490 B2
(45) Date of Patent: Feb. 23, 2021

(54) WAVEFORM CODING FOR MULTICARRIER WAKE UP RADIO FRAME

(71) Applicants: Jung Hoon Suh, Ottawa (CA); Osama Aboul-Magd, Ottawa (CA); Kwok Shum Au, Ottawa (CA); Jia Jia, Shenzhen (CN)

(72) Inventors: Jung Hoon Suh, Ottawa (CA); Osama Aboul-Magd, Ottawa (CA); Kwok Shum Au, Ottawa (CA); Jia Jia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/544,437

(22) Filed: Aug. 19, 2019

(65) Prior Publication Data

US 2019/0372815 A1 Dec. 5, 2019

Related U.S. Application Data

(63) Continuation of application No. PCT/CN2017/075251, filed on Feb. 28, 2017.

(51) Int. Cl.
*H04L 27/26* (2006.01)
*H04B 1/16* (2006.01)
*H04L 12/12* (2006.01)
*H04W 52/02* (2009.01)

(52) U.S. Cl.
CPC ....... *H04L 27/2605* (2013.01); *H04B 1/1615* (2013.01); *H04L 12/12* (2013.01); *H04L 27/2611* (2013.01); *H04L 27/2666* (2013.01); *H04W 52/0229* (2013.01)

(58) Field of Classification Search
CPC .......... H04L 27/02; H04L 27/04; H04L 27/06
See application file for complete search history.

(56) References Cited

U.S. PATENT DOCUMENTS

| 10,171,277 | B2 | 1/2019 | Suh et al. | |
| 10,644,820 | B2 | 5/2020 | Suh et al. | |
| 2008/0137716 | A1* | 6/2008 | Lakkis | H04B 1/713 375/135 |
| 2016/0007288 | A1 | 1/2016 | Samardzija et al. | |
| 2016/0374022 | A1 | 12/2016 | Ang et al. | |
| 2017/0303208 | A1 | 10/2017 | Suh et al. | |
| 2020/0092811 | A1* | 3/2020 | Park | H04L 27/2602 |
| 2020/0220641 | A1 | 7/2020 | Suh et al. | |

FOREIGN PATENT DOCUMENTS

| CN | 101404511 A | 4/2009 |
| CN | 105337744 A | 2/2016 |

OTHER PUBLICATIONS

Prete, Massimo del et al. Experimental Analysis of Power Optimized Waveforms for Enhancing Wake-up Radio Sensitivity, IEEE, Dec. 31, 2016, total 4 pages.

\* cited by examiner

*Primary Examiner* — Kevin Kim (57) ABSTRACT

Methods and systems for waking up a wireless receiving device having a wake-up receiver (WUR) circuit. A series of waveform coded symbols each represent a corresponding data bit from a wake-up frame, each of the waveform coded symbols comprising a guard interval followed by first and second sub-symbols of equal duration wherein the corresponding data bit is represented as a different relative energy distribution between the first and second sub-symbols.

27 Claims, 7 Drawing Sheets

WAVEFORM CODING FOR MULTICARRIER WAKE UP RADIO FRAME

RELATED APPLICATIONS

The present application is a continuation of, and claims benefit and priority to, International Application No. PCT/CN2017/075251, entitled "Waveform coding For Multicarrier Wake Up Radio Frame", filed Feb. 28, 2017, the contents of which are incorporated herein by reference.

FIELD

The present application relates to methods and systems for communicating with a Wake Up Radio.

BACKGROUND

In wireless communication, efficient use of the available power is one of the main goals of system design. Often, a wireless local area network (WLAN) device, such as in Internet of Things (IoT) applications, relies on a limited power supply (e.g., as supplied by rechargeable or non-rechargeable batteries). Examples of such a device may include sensor devices located in remote fields measuring some physical phenomenon, e.g., water level or temperature; and wearable devices measuring some bodily function, e.g., pulse rate.

Such a device may be designed to operate on a low duty cycle (e.g., communicating with an access point (AP) only once per day) and thus it may not be appropriate for its WLAN receiver circuit to be always on. The limited power supply (e.g., battery) of the device may be quickly exhausted if not provided with an appropriate sleep mode for the WLAN receiver circuit and an appropriate wake-up mechanism. The wake-up mechanism may require communication of wake-up signals between an AP and a device.

SUMMARY

Example embodiments are described herein that may in some applications provide a waveform coded wake up radio (WUR) frame format that mitigates against energy leakage and can be decoded at a WUR receiver that uses a low coefficient filter.

According to one aspect the present description describes a method of providing a wake-up signal in a communications channel. The method includes generating a series of waveform coded symbols that each represent a corresponding data bit from a wake-up frame, each of the waveform coded symbols comprising a guard interval followed by first and second sub-symbols of equal duration wherein the corresponding data bit is represented as a different relative energy distribution between the first and second sub-symbols. The method also includes modulating the waveform coded symbols onto a carrier frequency and transmitting a wake-up signal that includes the modulated waveform coded symbols in the communications channel.

In an example embodiment, the data bits are coded using on-off keying to represent data "1" and data "0" bits, wherein a data "1" bit is represented by a waveform coded symbol with the first sub-symbol having higher energy than the second sub-symbol, and a data "0" bit is represented by a waveform coded symbol with the first sub-symbol having lower energy than the second sub-symbol. In an alternative embodiment, the data bits are coded using on-off keying to represent data "1" and data "0" bits, wherein a data "0" bit is represented by a waveform coded symbol with the first sub-symbol having higher energy than the second sub-symbol, and a data "1" bit is represented by a waveform coded symbol with the first sub-symbol having lower energy than the second sub-symbol.

In some example embodiments the sub-symbol having the lower energy has substantially zero energy. In some examples, the guard interval of each waveform coded symbol has substantially zero energy, and in alternative examples the guard interval of each waveform coded symbol is a cyclic prefix copied from a trailing portion of a symbol used to generate the waveform coded symbol. In some configurations the guard interval of each waveform coded symbol has a duration that is ¼ of a total combined duration of the first and second sub-symbols, for example each waveform coded symbol has a duration of 4 μs, each guard interval has a duration of 0.8 μs, and each sub-symbol has a duration of 1.6 μs. In some configurations, the guard interval of each waveform coded symbol has a duration that is ¹⁄₁₀ of a total duration of the waveform coded symbol, for example each waveform coded symbol has a duration of 8 μs, each guard interval has a duration of 0.8 μs, and each sub-symbol has a duration of 3.6 μs.

In some configurations, generating the series of waveform coded symbols comprises applying time domain waveform coding to a series of identical multi-carrier modulated symbols. The multi-carrier modulated symbols may, for example, have a subcarrier spacing that is equal to or greater than an inverse of the total combined duration of the first and second sub-symbols of the waveform coded symbols. In some examples, each multi-carrier modulated symbol comprises a set of subcarriers in which alternating subcarriers are set to one and zero respectively, and the set of subcarriers is centrally located in a larger group of subcarriers that make up the multi-carrier modulated symbol. In one specific example, the larger group of subcarriers consists of 64 subcarriers, and the set of subcarriers includes 14 subcarriers of which 7 are set to one, and the sub-carriers have an inter-carrier spacing of 312.5 KHz.

In some examples the method also includes generating a plurality of series of the waveform coded symbols, each series representing a respective wake-up frame. The wake-up signal has a predefined bandwidth and each series is assigned a respective sub-band within the predefined bandwidth, the transmitted wake-up signal simultaneously including the plurality of series of the waveform coded symbols. In some examples, the plurality of series of the waveform coded symbols are appended to a legacy preamble symbol that occupies the predefined bandwidth. In some examples, each series of waveform coded symbols comprises multicarrier modulated symbols having a uniform subcarrier spacing. In one specific example, the predefined bandwidth is 20 MHz, and a total of three series of waveform coded symbols are included in the transmitted wake-up signal, each series having a bandwidth of 5 MHz or less, wherein a frequency guard band is included between adjacent series. The frequency guard bands may each include at least a single unused subcarrier between the adjacent series.

According to another aspect a transmitter is described for providing a wake-up signal in a communications channel. The transmitter includes a waveform coding module configured to generate a series of waveform coded symbols according to the aspects and embodiments summarized above.

According to another aspect is a method and receiver for receiving a wake-up signal transmitted according to the aspects and embodiments summarized above. The receiver receives, at a wake up radio circuit, a series of waveform coded symbols that each represent a corresponding data bit from a wake-up frame, each of the waveform coded symbols comprising a guard interval followed by first and second sub-symbols of equal duration wherein the corresponding data bit is represented as a different relative energy distribution between the first and second sub-symbols. The receiver compares, at the wake up radio circuit, the relative energy distribution between the first and second sub-symbols of each waveform coded symbol to determine if the waveform coded symbol represents a data bit "1" or a data "bit "0" to generate a recovered wake-up frame.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

A user device or station such as a machine type device or sensor device that is intended to operate in a wireless network such as a wireless local area network (WLAN) may have a separate low-power Wake Up Radio (WUR) circuit in addition to a higher power WLAN transceiver circuit. A WUR circuit is generally a low-power receiver circuit designed for receiving and detecting a wake-up signal, and may in some examples be a simplified version of the main WLAN transceiver circuit and may be implemented on integrated circuit (IC) or chip. The WUR circuit communicates with the WLAN transceiver circuit, or other equivalent circuit, of the device, so the WLAN transceiver circuit may sleep and conserve power until the WUR circuit wakes up the WLAN transceiver circuit. The WUR circuit wakes up the WLAN transceiver circuit, or other equivalent circuit, when the WUR circuit detects a wake-up signal from an access point AP (typically, an AP associated with the WLAN device).

Figure 1:
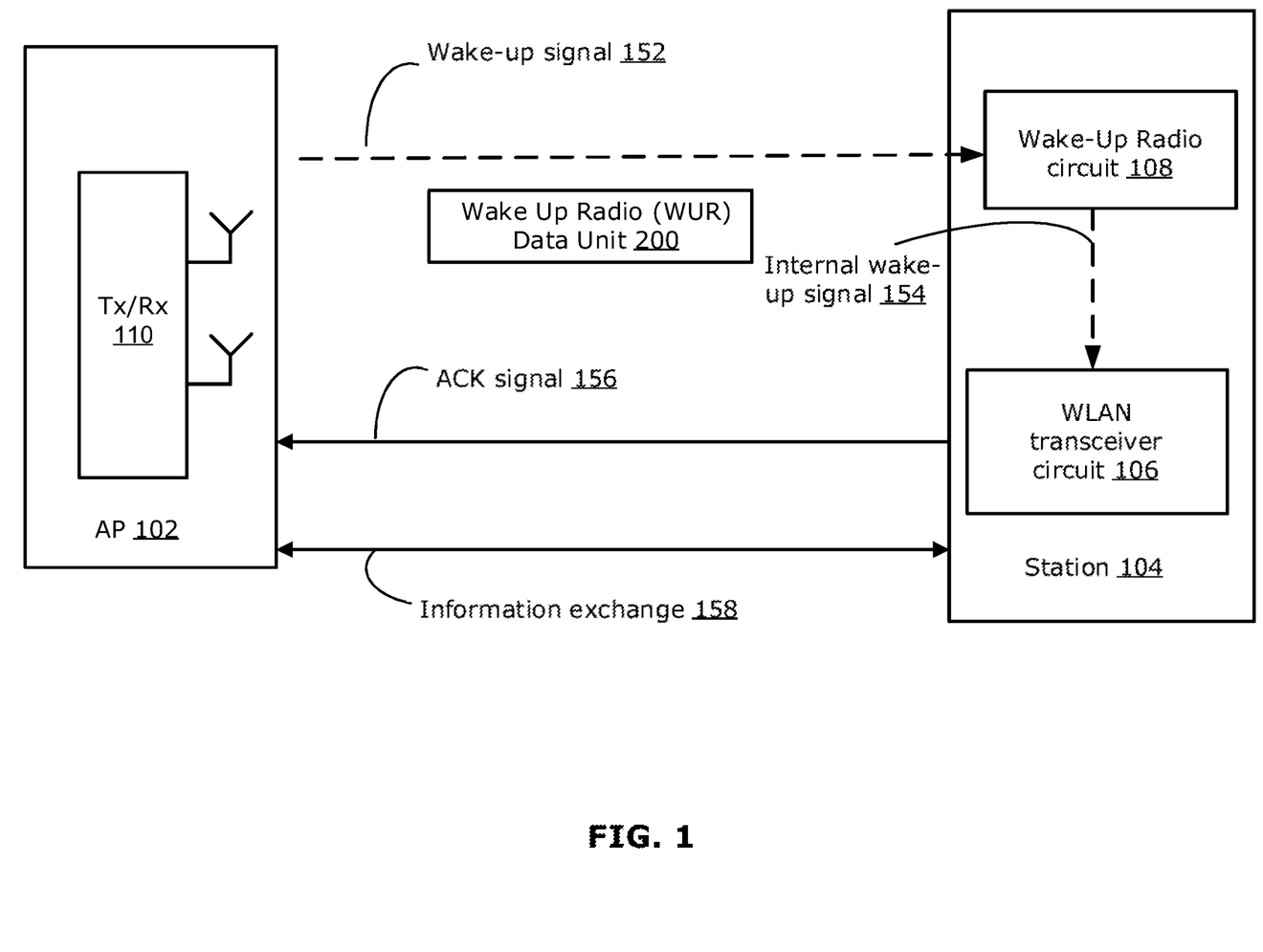
FIG. 1 is a block diagram illustrating communications between an AP and an example station having a Wake Up Radio circuit.

In this regard, FIG. 1 is a schematic diagram illustrating an example AP 102 and an example station 104 associated with the AP 102. In example embodiments the station is a low duty cycle WLAN device or other wireless device. The example station 104 includes a WLAN transceiver circuit 106 (e.g., a Wi-Fi transceiver) and a WUR circuit 108 (also referred to simply as WUR circuit 108). The AP 102 includes WLAN transceiver circuit 110. In example embodiments, the WUR circuit 108 is a simple low power receiver that does not have a transmitter and functions to wake up the WLAN transceiver circuit 106 when needed.

FIG. 1 illustrates a set of example signals that may be communicated for waking up a sleeping WLAN receiver circuit 106. The AP 102 may send a wake-up signal 152, carrying a Wake-Up-Radio (WUR) data unit 200 (described further below) to the station 104. The WUR data unit 200 is detected by the WUR circuit 108, and the WUR circuit 108 sends an internal wake-up signal 154 to the WLAN receiver circuit 106, waking up the WLAN transceiver circuit 106 if the WLAN receiver circuit 106 is in sleep mode. The WLAN transceiver circuit 106 then sends an ACK signal 156 back to the AP 102. Appropriate information exchange 158 between the AP 102 and the station 104 (via the WLAN transceiver circuit 106) may then take place. After the information exchange 158 is finished, the WLAN transceiver circuit 106 may return to the sleep state.

While FIG. 1 shows wakeup signal 152 being communicated to a WUR circuit 108 that is associated with a WLAN transceiver circuit 106, the processes and systems described in the present disclosure may be applicable to other circuits, including other wireless receiver circuits, which may benefit from a wake-up mechanism.

Figure 2:
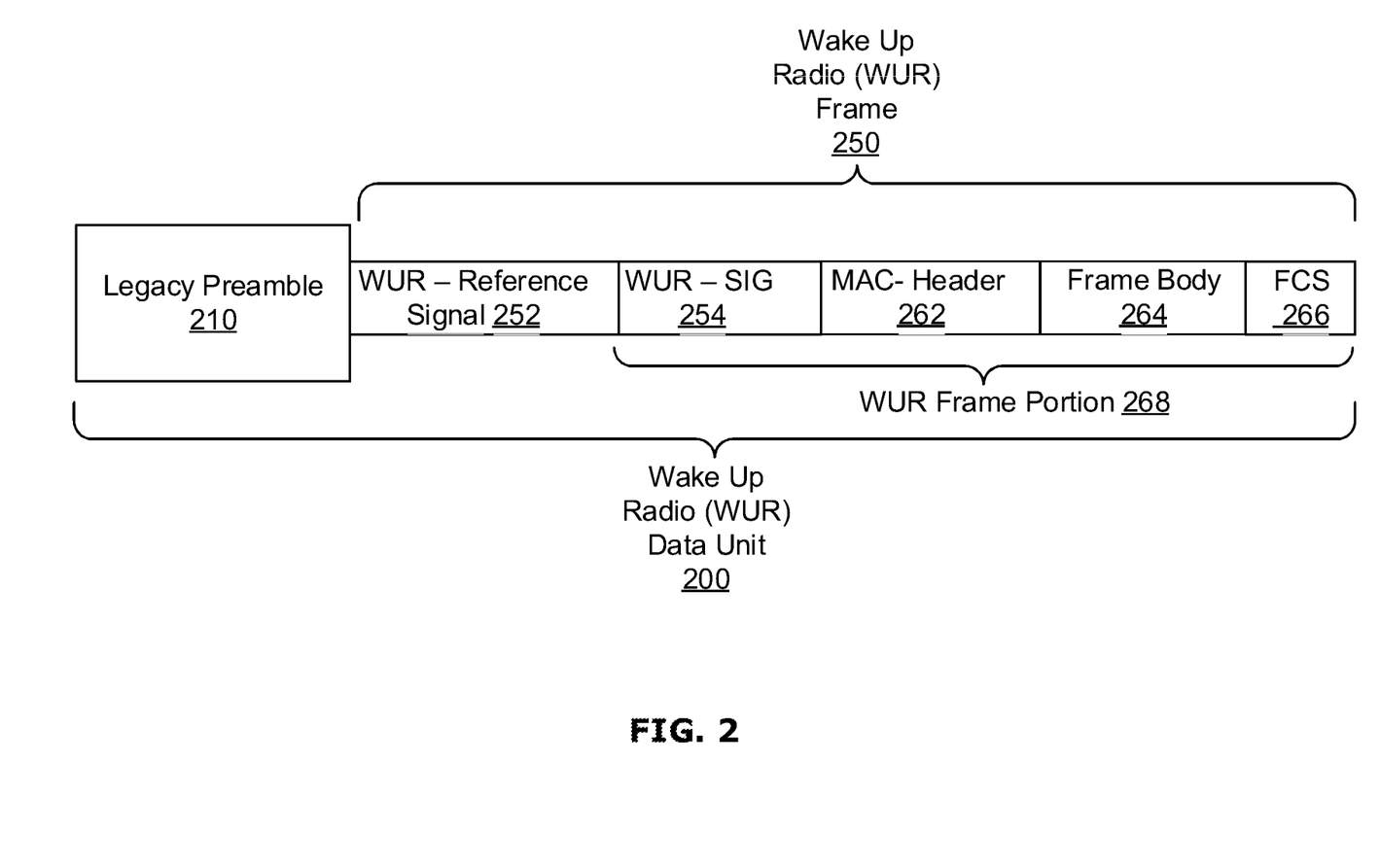
FIG. 2 illustrates a frame format for an example wake-up radio data unit.

An example frame format for a WUR data unit 200 is shown in FIG. 2. The heights of the various blocks shown in FIG. 2 illustrate the relative bandwidths (BWs) of each portion. In the example of FIG. 2, the WUR data unit 200 includes a legacy preamble 210 pre-pended to a wake-up portion or frame (WUR frame) 250. The WUR frame 250 includes a WUR—Reference Signal field 252, a WUR signal (SIG) field 254, a MAC header 262, a frame body 264 and a frame check sequence (FCS) 266. In an example embodiment WUR—Reference Signal field 252 may include a wakeup signal preamble, for example a pseudo noise (PN) sequence. The WUR signal (SIG) field 254 may include a control signal. The MAC header 262 may include a receiver address. The MAC header 262, frame body 264 and FCS 266 may together be referred to as the payload of the WUR frame 250. In some examples, WUR frame 250 may omit one or more of the frame portions identified in FIG. 2.

The legacy preamble 210 serves to silence all non-destination WLAN devices during the transmission of the WUR data unit 200. The legacy preamble 210 may include a legacy short training field (L-STF), a legacy long training field (L-LTF), and a legacy signal (L-SIG) field. The legacy preamble 210 is generally 20 MHz wide in BW, in accordance with legacy standards. In the example of FIG. 2, the WUR frame 250 is illustrated as being narrower in BW than the legacy preamble 210, for example the WUR frame 250 may be 5 MHz in BW, although other BWs may also be suitable as will be explained in greater detail below. The legacy preamble 210 is used for coexistence with other IEEE 802.11 devices, however in some examples the legacy preamble 210 may be omitted.

The WUR-Reference Signal 252 is provided for packet detection and synchronization. In some examples, WUR-Reference signal 252 may include a short training field (STF) and a long training field (LTF) that can be used by the WUR circuit 108 to detect the WUR frame 250 as distinct from other frames and allow the WUR circuit 108 to synchronize to the WUR frame 250. In some examples, WUR-Reference Signal 252 may include a sequence that can be correlated at the WUR circuit 108 to facilitate frame synchronization.

In example embodiments, WUR circuit 108 is implemented as a simple low power consuming receiver circuit, and accordingly WUR frame 250 is designed to enable efficient and accurate decoding at a low power WUR circuit 108. In this regard, time-domain waveform coding (WFC) is used in example embodiments to encode portions of the WUR Frame 250 that follow the WUR Reference Signal 252, shown in FIG. 2 as WUR Frame Portion 268. In at least some applications filtering is applied at WUR circuit 108 to improve receiver performance. Typically, the increasing the filter coefficient (e.g. number of taps) at a filter increases the accuracy of the filtering, however it also increases cost and complexity of the filter. Furthermore, simulations have indicated that in some examples of a WFC signal, the greater the number of taps used in a filter at the WUR circuit 108 the greater the chance of inter-symbol interference occurring is. Accordingly, example embodiments are described herein that may in some applications provide a waveform coded WUR Frame format that can be decoded at a WUR receiver that uses a low coefficient filter.

Figure 3:
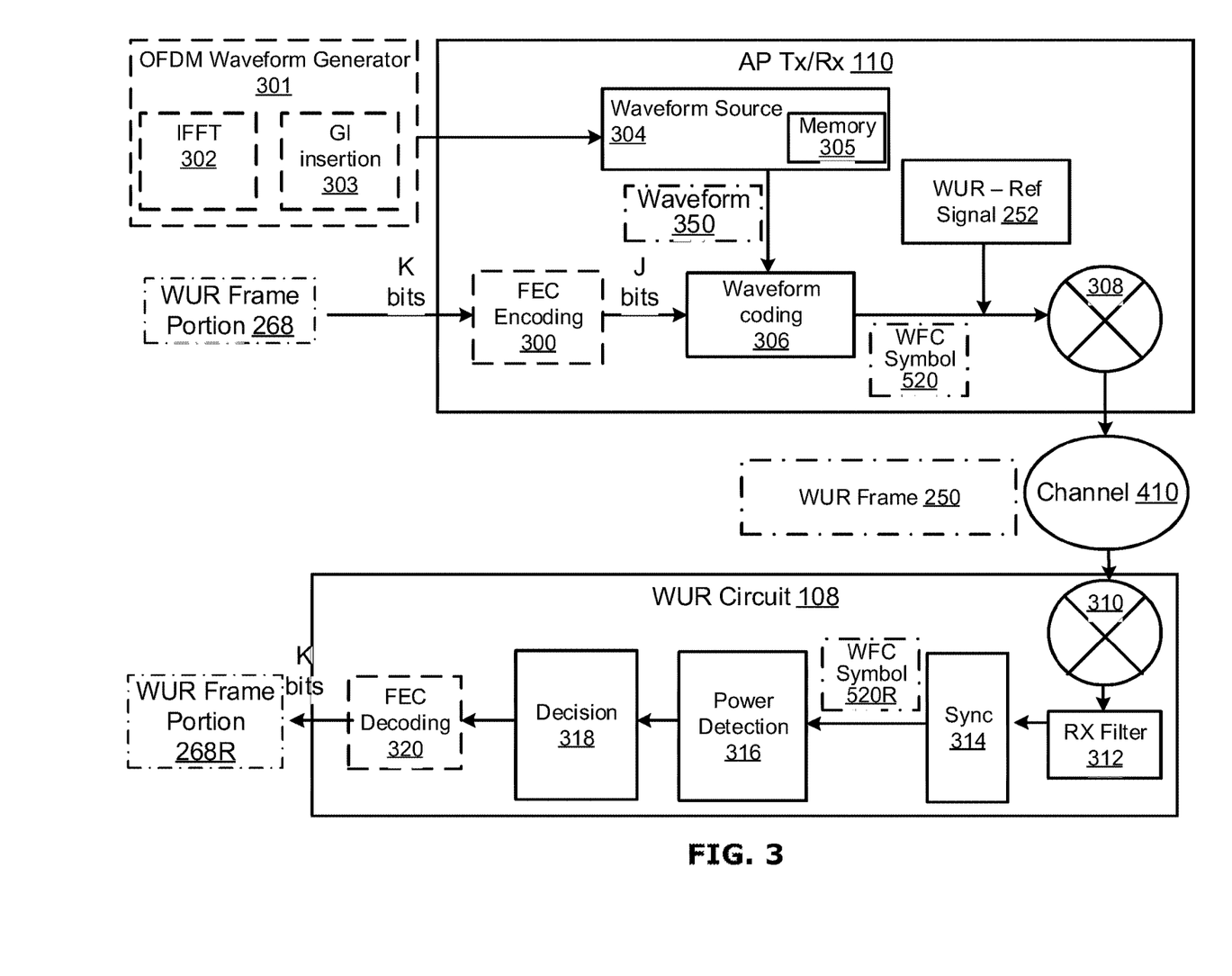
FIG. 3 is a block diagram illustrating a wake-up frame encoding and decoding system according to an example embodiment.

In this regard, FIG. 3 is a basic system block diagram illustrating a WUR system that employs waveform coding. FIG. 3 shows the process flow applied at the AP transceiver 110 and the WUR circuit 108 to WUR frame portion 268. In some examples, each processing block 310, 312, 314, 316, 318 and 320 shown as being performed at WUR circuit 108 represents an operation that may be implemented as a module or element that is part of a common integrated circuit. Similarly, each processing block 300, 304, 306 and 308 shown as being performed at AP transceiver 110 represents an operation that may for example be implemented as a module or element of a common integrated circuit.

In the example of FIG. 3, WUR frame portion 268 is input as a string of On-Off Keying (OOK) mapped binary data bits to AP transceiver 110. In some examples forward error correction (FEC) encoding to apply error correction and/or compress data (e.g. encoding K bits to J bit codewords) can be applied to the binary data of WUR Frame Portion 268 by an FEC encoding operation 300, however such encoding is optional.

AP transceiver 110 includes a waveform source 304 that provides symbol waveforms 350 to a waveform coding operation 306. Symbol waveform 350 has a pre-defined energy configuration within a pre-defined bandwidth (BW) and a predefined total symbol duration ($T_{tot}$) that includes a predefined number of samples (L). In some example embodiments symbol waveform 350 is a multi-carrier waveform, and in some embodiments symbol waveform 350 may be a single carrier waveform. Although symbol waveform 350 may take a number of different configurations, one example of a multi-carrier version will first be described to facilitate an understanding of example embodiments of the invention.

Figure 4:
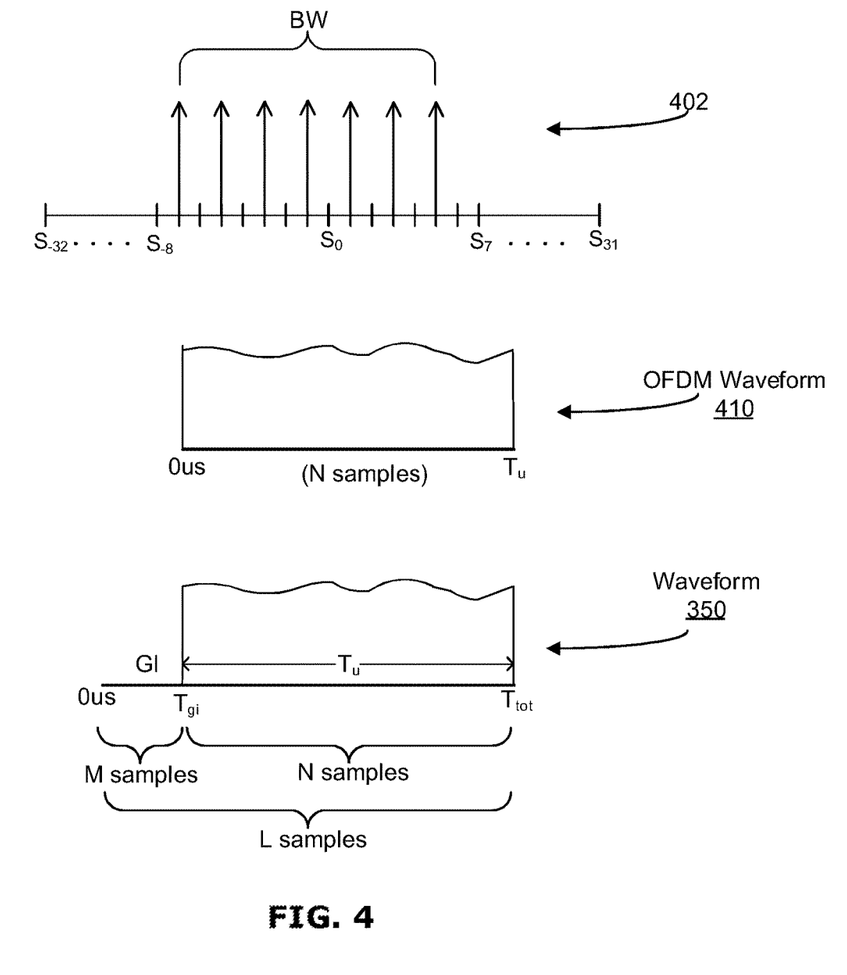
FIG. 4 shows frequency domain and time domain representations of example waveforms used in the system of FIG. 3.

In the presently described example, waveform source 304 includes memory 305 that stores a previously generated time domain version of an Orthogonal Frequency Division Multiplex (OFDM) waveform such as the example time domain symbol waveform 350 that is shown in FIG. 4. In particular, in an example embodiment an OFDM waveform generator 301 that includes a 64 point inverse fast Fourier transform (IFFT) operation 302 is used to generate an frequency domain OFDM symbol 402 in which a sub-set of central subcarriers are alternated between 1 and 0 and the remaining subcarriers are set to 0. In the illustrated example symbol 402 of FIG. 4, central subcarrier $S_0$ is a DC Null, and the seven subcarriers $S_{-7}, S_{-5}, S_{-3}, S_{-1}, S_1, S_3, S_5$ are set to one. The alternating $S_{-6}, S_{-4}, S_{-2}, S_2, S_4$ and the remaining subcarriers $S_{-32}$ to $S_{-8}$ and $S_6$ to $S_{31}$ are each set to 0. In the illustrated example, the symbol 402 is derived from a conventional 802.11 OFDM symbol having the numerology parameters: Number of subcarriers=64, with number of used subcarriers $SC_U$=14 (with $S_0$ used for a DC null); useful symbol duration $T_u$=3.2 µs; and subcarrier spacing SS=312.5 Khz, with every second one of the subcarriers (e.g. 7 sub-carriers) of the middle 14 subcarriers set to "1". The bandwidth BW of symbol 402 is 13×312.5 Khz=4.1 MHz. OFDM waveform 410 in FIG. 4 represents a time domain version of OFDM symbol 402. In example embodiments, OFDM time domain waveform 410 is generated using the standard 802.11 sampling rate of 20 MHz, such that OFDM waveform 410 includes N=64 samples.

In an example embodiment, OFDM waveform generator 301 also includes a GI insertion operation 302 that operates in the time domain to prepend a guard interval GI of duration $T_{gi}$=0.8 µs (e.g. ¼ of useful symbol duration $T_u$) to the OFDM waveform 410 to generate waveform 350 with a duration $T_{tot}=T_u+T_{GI}$=4 µs. In example embodiments, guard interval GI is created by prepending a set of M signal samples to the front of the N signal samples of OFDM waveform 410.

Guard interval GI may take different forms in different example embodiments. For example, guard interval GI could be generated using the conventional OFDM method of coping a 0.8 µs cyclic prefix (CP) portion (eg. M=16 samples) from the trailing end OFDM waveform 410 and prepending the CP it to provide a guard interval GI, with the result that symbol waveform 350 has a total symbol duration of $T_{tot}$=4 µs and includes L=80 samples. In an alternative example embodiment, which is shown in FIG. 4, the guard interval GI is blank energy such that the waveform 350 has no or negligible amplitude for the duration $T_{gi}$, which may boost the transmitter energy for the portions of the symbol that are included the useful symbol duration $T_u$. In such an embodiment, M=16 samples of zero energy are prepended to the N=64 symbols of OFDM waveform 410 to provide symbol waveform 350. In some embodiments, a non-zero dummy signal could be used for the guard interval GI.

As noted above, in example embodiments the operations performed by OFDM symbol generator 301 to provide symbol waveform 350 are done at a configuration time prior to WUR frame 250 processing and transmission, with waveform source 304 then providing successive copies of the pre-stored symbol waveform 350 at the time of WUR frame 250 transmission by AP Tx/Rx 110, thus eliminating the requirement for an IFFT operation for each symbol waveform used for WUR frame 250. In at least some example embodiments, OFDM waveform generator 301 is configurable and can be used to generate symbol waveforms that have different numerology parameters than those stated above, such that the stored waveform can be changed if required.

In the example of FIG. 3, a waveform coding operation 306 is used to code the J data bits encoded from WUR Frame Portion 268 onto J successive symbol waveforms 1920. In an example embodiment, the waveform coding that is applied at operation 306 is Manchester coding, which is also known as phase encoding (PE). In particular, Manchester coding is a line code in which the encoding of each data bit is either low then high, or high then low, of equal time. Accordingly, in the context of a waveform 350, the non-GI portion of waveform 350, and in particular the duration indicated by $T_u$, is effectively divided into two sub-symbols of equal duration with each "0" bit is encoded as a set of two sub-symbols and, each "1" bit is encoded as set of two sub-symbols. In an example embodiment, the encoding is as shown in Table 1 below:

TABLE 1

Manchester encoding of OOK data bits:

| OOK Data Bit | First sub-symbol SUB$_1$ | Second sub-symbol SUB$_2$ |
|---|---|---|
| "1" | 1 (ON) | 0 (OFF) |
| "0" | 0 (OFF) | 1 (ON) |

It will be appreciated that the sub-symbol order described herein can be reversed for data bits 0 and 1 in alternative configurations.

In example embodiments, an "OFF" sub-symbol includes substantially blank or zero energy, and an "ON" sub-symbol includes a higher energy level that matches the energy of the corresponding duration of the symbol waveform 350. Waveform coding operation 306 applies the PE coding to the symbol waveform 350 in the time domain, and in this regard, FIG. 5 graphically illustrates, in time domain the coding that is applied to OFDM symbol waveform 350 to generate a data "1" WFC symbol 520-1 and a data "0" WFC symbol 520-0 (generically referred to herein as WFC symbol 520).

In some example embodiments the standard 802.11 sampling rate of 20 MHz is applied by waveform coding operation 306 when generating the data symbols 520. Accordingly, in the case of a Data "1", the waveform coded output symbol 520-1 has a duration of $T_{tot}$=4 µs and L=80 samples and includes, in the following order: a guard interval of duration $T_{gi}$=0.8 µs that includes M=16 samples that correspond to GI samples of waveform 350; a first sub-symbol SUB$_1$ of duration $T_u/2$=1.6 µs that includes N/2=32 samples copied from the portion of symbol waveform 350 that follows the GI portion; and a second sub-symbol SUB$_2$ of duration $T_u/2$=1.6 µs that includes N/2=32 samples in which the subcarrier energy has been forced to "0". In the example shown in FIG. 5, the symbol 520-1 has negligible or zero energy except during the duration between $T_{gi}$ and $T_u/2+T_{gi}$ (namely 0.8 µs to 2.4 µs)

In the case of data "0" output symbol 520-0, the GI portion remains the same and the order of sub symbols SUB$_1$ and SUB$_2$ are reversed such that in the case of a Data "0", the waveform coded output symbol 520-0 has a duration of $T_{tot}$=4 µs and L=80 samples and includes, in the following order: a guard interval of duration $T_{gi}$=0.8 µs that includes M=16 samples that correspond to GI samples of waveform 350; a first sub-symbol SUB$_1$ of duration $T_u/2$=1.6 µs that includes N/2=32 samples in which the subcarrier energy has been forced to "0"; and a second sub-symbol SUB$_2$ of duration $T_u/2$=1.6 µs that includes N/2=32 samples copied from final 32 samples of symbol waveform 350. In the example shown in FIG. 5, the symbol 520-0 has negligible or zero energy except during the duration between $T_u/2+T_{gi}$ to $T_{tot}$ (namely 2.4 µs to 4 µs).

Accordingly, in example embodiments each of the J data bits from WUR Frame Portion 268 is represented at the output of waveform coding operation 306 as a WFC symbol 520. Each WFC symbol 520 has a defined total symbol duration $T_{tot}$ that corresponds to L samples. Each WFC symbol 520 includes two components, namely: a leading guard interval GI that has a leading guard interval duration $T_{gi}$ that corresponds to M samples; and a useful symbol component immediately following the guard interval GI and having a useful symbol duration $T_u$ that corresponds to N samples. The useful symbol of duration $T_u$ is divided into two sub-symbols SUB$_1$ and SUB$_2$ that each have equal length durations $T_u/2$ corresponding to N/2 samples. Binary bit information is represented by the equal duration two sub-symbols SUB$_1$ and SUB$_2$ being either low then high, or high then low. The actual signal value contained in the guard interval GI is immaterial, however using a low or zero energy signal can boost transmitter energy in non-zero regions of the symbol. In example embodiments the WFC Symbol 520 is configured to fall within a defined BW with minimal leakage, facilitating the use of a low tap filter at WUR circuit 108.

It will be appreciated that WFC symbols 520 having the characteristics stated in the previous paragraph could be generated using methods, components and symbol numerology other than those described in respect of the system shown in FIG. 3. Furthermore, in some example embodiments copies of WFC symbols 520-1 and 520-0 can be pre-generated and stored in memory 305 at waveform source 304, with wave form coding operation 306 selecting the appropriate WFC symbol to output based on the OOK value of an WUR frame portion bit.

Accordingly, in example embodiments, each OOK mapped data bit is represented at the output of waveform coding operation 306 as a WFC symbol 520 such that J data bits results in J WFC symbols 520, each containing a guard interval GI followed by 2 successive sub-symbols that are either high then low (symbol 520-1) or low then high (symbol 520-0). The WUR-REF Signal 252 is prepended to the resulting WFC symbol 520, which is then upconverted at modulator 308 to a channel carrier frequency and transmitted as WFC WUR frame signal 250 through wireless network channel 410. In example embodiments the same transmit filter used for 802.11 is used to provide spectral filtering to ensure that the transmitted symbols, including any edge tones beyond the active subcarriers SC$_u$, fall within a 20 MHz spectral mask.

At WUR circuit 108, the WFC WUR frame signal 250 is received as part of wake-up signal 152 at WUR circuit 108 and down converted at modulator 310 to baseband. The baseband WFC WUR frame signal 250 is then passed through filter 312 to restrict the signal to the bandwidth BW. As noted above, in example embodiments filter 312 is a low tap filter—for example a 1 or 2 tap filter—to reduce filter cost, power consumption.

In example embodiments, synchronization operation 314 relies on WUR—Reference Signal 252 prepended in WFC WUR frame signal 250 to allow WUR circuit 108 to synchronize sample timing to the incoming symbol boundaries of individual received WFC symbols 520R, which are then processed by power detection operation 316. In example embodiments, power detection operation 316 processes each received WFC symbols 520R by stripping off the prepended guard interval GI and then measuring the power distribution in each of first and second sub-symbols SUB$_1$ and SUB$_2$. In particular, power detection operation 316 is configured to sample the WFC symbol 520R at the same frequency used at waveform coding operation 306 (for example the conventional 20 MHz of 802.11) and process the WFC symbol 520R as follows: the first M samples (corresponding to duration $T_{gi}$) are discarded; an average power distribution value is determined for the next N/2 samples (corresponding to a duration of $T_u/2$) which represent sub-symbol SUB$_1$; and a further average power distribution value then determined for the next N/2 samples (corresponding to a duration of $T_u/2$) which represent sub-symbol SUB$_2$. In the example of a 20 MHz sampling rate and total symbol time of $T_{tot}$=4 µs the discarded guard interval includes M=16 samples, and first sub-symbol SUB$_1$ and second sub-symbol SUB$_2$ each include N/2=32 samples.

Decision block 318 is configured to compare the average power distribution values between the first and second sub-symbols $SUB_1$ and $SUB_2$ and make a corresponding data "0" or "1" decision. In the illustrated example, if the magnitude of the average power distribution value is greater in the first sub-symbol $SUB_1$ than the second sub-symbol $SUB_2$, then the received WFC symbol 520-R is decoded as a data "1"; and if the average power magnitude value is greater in the second sub-symbol $SUB_2$ than the first sub-symbol $SUB_1$, then the received WFC symbol 520-R is decoded as a data "0". The successive data bits from decision operation 318 are assembled to provide recovered WUR frame portion 268R (with an intermediate FEC decoding operation 320 being applied in the event that encoding occurred at AP transceiver 110). The recovered WUR frame portion 268R may for example contain information and instructions for internal wake-up signal 154 for the main WLAN transceiver circuit 106.

Figure 5:
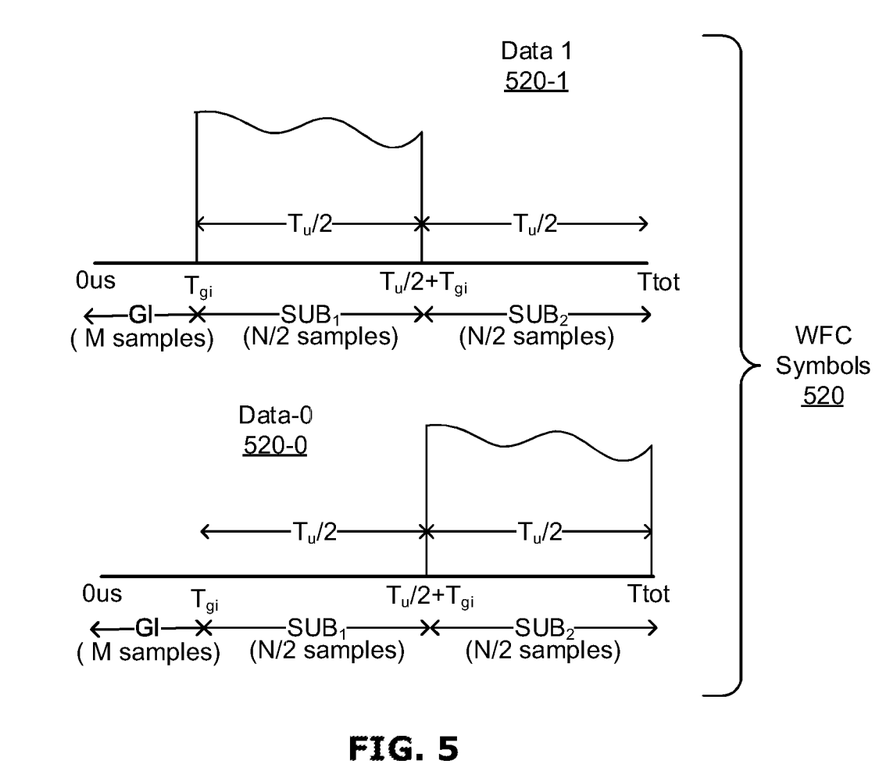
FIG. 5 shows time domain representations of example coded waveforms used in the system of FIG. 3.

As noted above, WFC symbols 520 having a general waveform configuration such as shown in FIG. 5 could be generated using different base waveforms, subcarrier configurations, symbol durations, guard interval durations and waveform numerologies than discussed above. By way of example, in one alternative embodiment a WFC symbol is used that has the same multicarrier parameters as set out above but with different symbol timing parameters. In particular, the multicarrier parameters of alternative WFC symbol are: number of subcarriers=64, with number of used subcarriers $SC_U$=14, with $S_0$ used for a DC null and subcarrier values of the middle 14 subcarriers alternating between "1" and "0" to provide 7 subcarriers set to "1" with the remaining subcarriers set to "0"; and subcarrier spacing SS=312.5 Khz, providing symbol BW of 4.1 MHz. However, the symbol timing parameters are modified such that: symbol duration $T_{tot}$=8 µs (corresponding to 160 samples at 20 MHz); Guard interval duration remains at $T_{gi}$=0.8 µs (16 samples), such that its relative duration is reduced to $1/10^{th}$ of the total symbol duration; and the duration of each sub-symbol $SUB_1$, $SUB_2$ is $T_u/2$=3.6 µs (72 samples). In some examples, such a waveform may be formed by appending two 4 µs OFDM based symbols together.

In an alternative example embodiment, the symbol timing parameters are modified such that: symbol duration $T_{tot}$=7.2 µs; Guard interval duration remains at $T_{gi}$=0.8 µs; and the duration of each sub-symbol $SUB_1$, $SUB_2$ is $T_u/2$=3.2 µs.

In a further alternative, a 128 point IFFT with a 20 MHz bandwidth is used to generate a base OFDM waveform symbol with sub-carrier spacing of 156.25 KHz, and a useful symbol duration of $T_u$=6.4 µs. A guard interval GI with duration $T_{gi}$=0.8 µs is added to create a WFC waveform having a total duration $T_{tot}$=7.2 µs, with each sub symbol $SUB_1$ and $SUB_2$ having a duration of 3.2 µs. In a further variation, the GI duration is lengthened to 1.6 µs, providing an 8 µs usec long WFC symbol.

In different embodiments different numbers and patterns of sub-carriers may be set to "1", and different durations for total symbol length, as well as the components within each symbol.

In further alternative embodiments WFC symbols 520 are generating using single carrier signals that meet the waveform configuration shown in FIG. 5.

Figure 6:
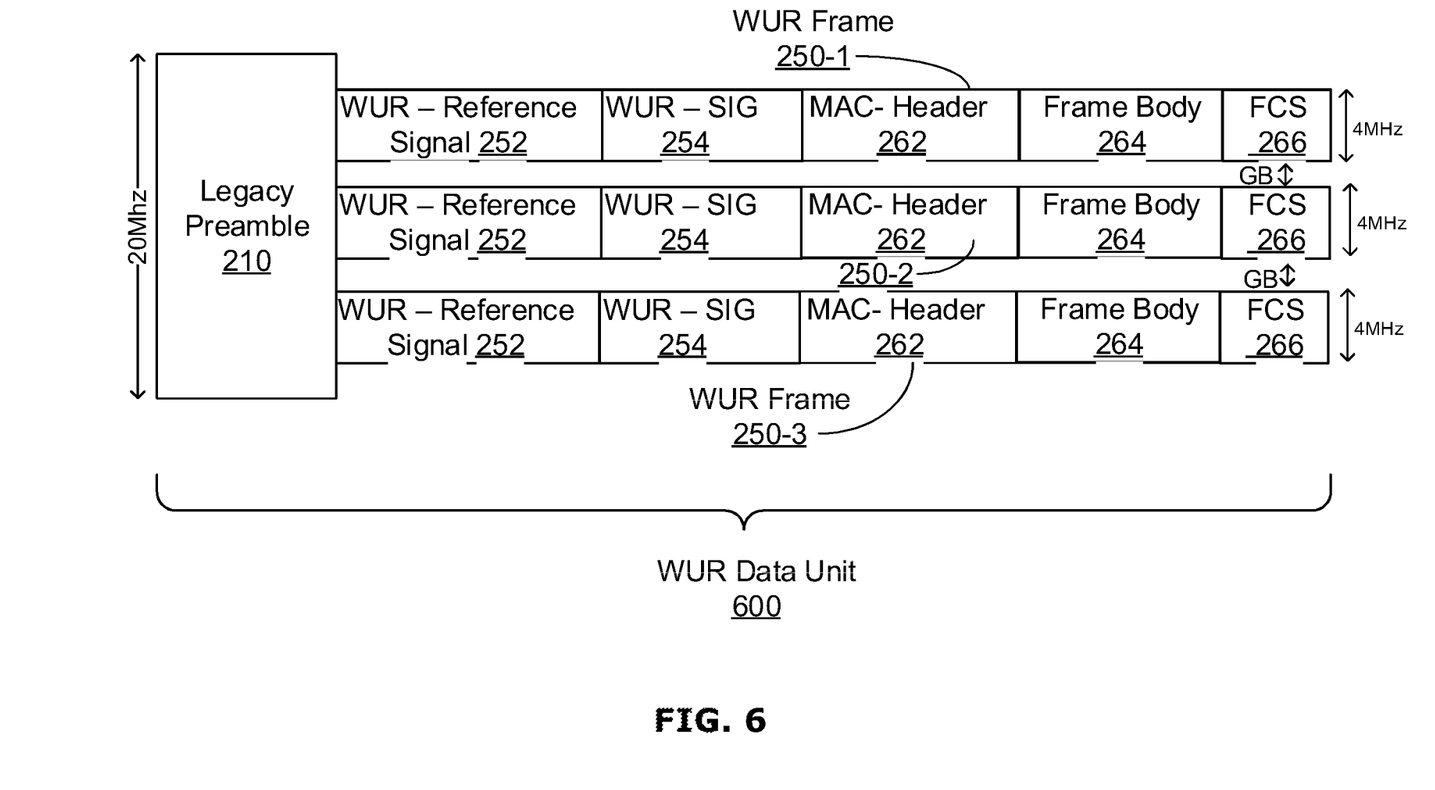
FIG. 6 illustrates a frame format for an example wake-up radio data unit according to another example embodiment.

Referring again to FIG. 2, in the examples discussed above legacy preamble 210 will generally have a bandwidth that is much greater than that of WUR frame 250. In the specific examples discussed above, legacy preamble 210 occupies 20 MHz compared to the 4.1 MHz BW of WUR Frame 250 disclosed above. In some examples, the excess bandwidth in WUR data unit 200 following the legacy preamble 210 is used to allow multiple WUR frames 250 to be transmitted for different WUR circuits 108 using different frequency sub-bands as part of the same WUR Data Unit 200. In this regard, FIG. 6 illustrates a WUR data unit 600 according to a further example embodiment that includes a legacy preamble 210 with a bandwidth of 20 Mhz followed by three parallel WUR Frames 250-1, 250-2 and 250-3 that each occupy a unique bandwidth of 4.1 MHz. Each of the WUR Frames 250-1, 250-2 and 250-3 is generated in a manner similar to the WUR frame 250 described above. In the illustrated embodiment, adjacent WUR Frames 250-1 and 250-2 are separated in frequency by a guard band GB and adjacent WUR Frames 250-2 and 250-3 are also separated in frequency by further guard band GB. In at least some example embodiments, the guard bands GB are provided by two OFDM tones or subcarriers, providing a guard band GB bandwidth of 937.5 KHz. In some example embodiments a single OFDM tone may be used to provide a guard band GB of 625 KHz, and in some example embodiments more than two OFDM tones may be used.

Figure 7:
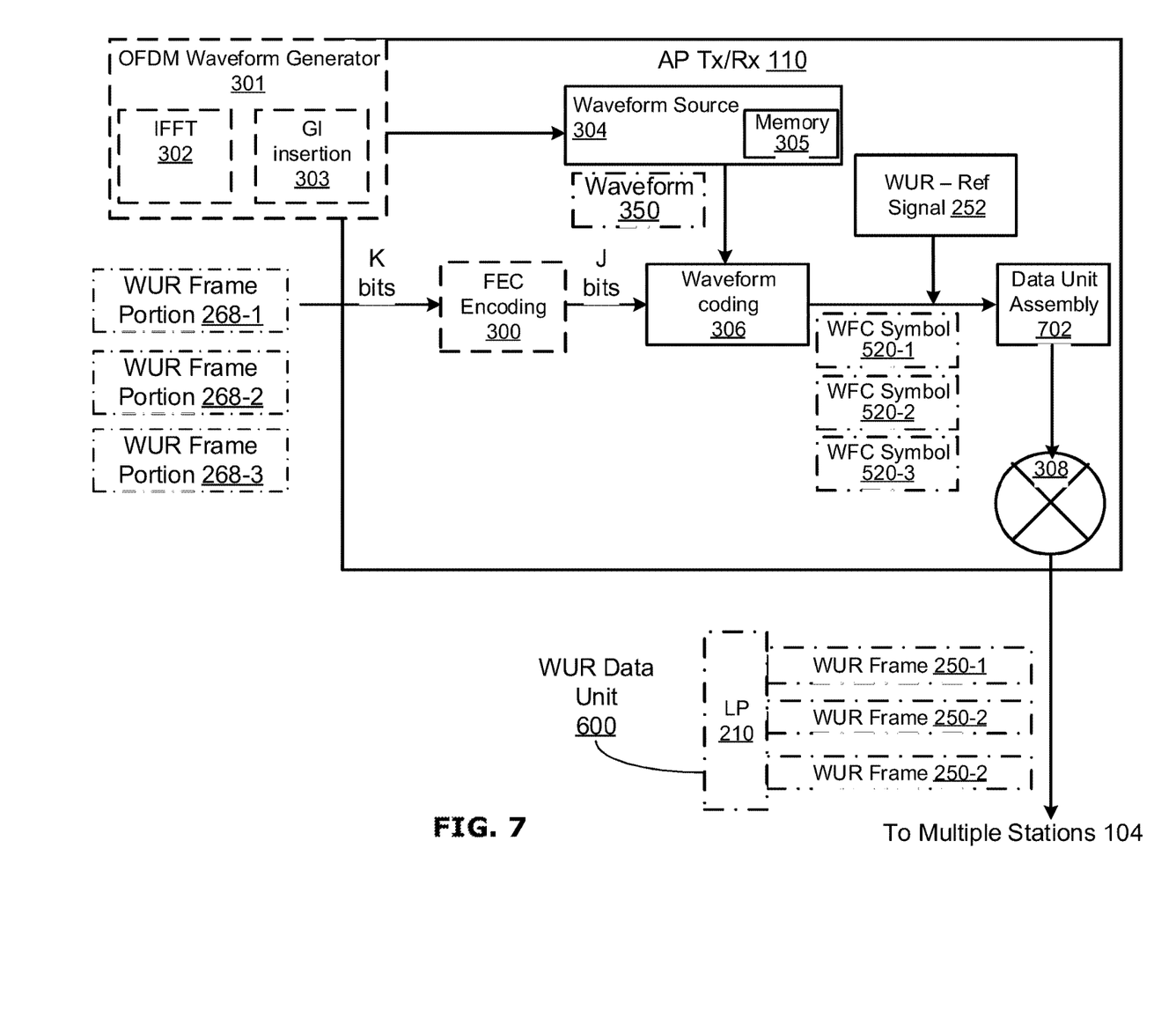
FIG. 7 is a block diagram illustrating wake-up frame encoding for the data unit of FIG. 6.

FIG. 7 shows a block diagram representation of operations performed at access point AP transceiver 110 to transmit a WUR Data Unit 600 that includes multiple WUR Frames 250-1, 250-2, and 250-3. The AP transceiver operations shown in FIG. 7 are similar to those described above in respect of FIG. 3 with the exception of differences that will be apparent from the present description.

In example embodiments, a scheduling function is performed in which different WUR Frames 250-1, 250-2, and 250-3 within WUR data unit 600 are each allocated for different receiving stations 104 that communicate with the AP 102. In at least some examples, the receiving stations 104 have been pre-configured or pre-informed of the specific WUR Frame 250-1, 250-2, or 250-3 that has been allocated to it, enabling the station 104 to tune the filter 312 of its respective WUR circuit 108 to the bandwidth of its allocated WUR Frame.

At access point transceiver 110, the WUR Frame portions 268-1, 268-2 and 268-3 of WUR Frames 250-1, 250-2, and 250-3, respectively, are provided as streams of binary OOK data to waveform coding operation 306. In some embodiments the binary OOK data is subjected to FEC coding operation 300 prior to waveform coding 300. In some example configurations, each of the WUR Frame portions 268-1, 268-2 and 268-3 are simultaneously waveform coded in parallel at waveform coding operation 306. In some example configurations, each of the WUR Frame portions 268-1, 268-2 and 268-3 are processed sequentially to produce respective strings of WFC Symbols 520-1, 520-2, 520-3 that are buffered, prepended with WUR reference Signals 252 and then combined to form transmittable WUR Data Unit 600. In such an embodiment, the respective strings of WFC Symbols 520-1, 520-3 and 520-3 are provided to a data unit assembly operation 702 where the WUR data unit 600 is assembled with WUR frames 250-1, 250-2 and 250-3 located in their respective frequency sub-bands and appended to legacy preamble 210 to form WUR data unit 600, then up-converted at modulator 308 and transmitted in a wireless channel for multiple stations 104.

Each of the stations 104 includes a WUR circuit 108 for performing the operations shown in FIG. 3. As noted above, the filter 312 of each WUR circuit 108 is tuned to a specific frequency band to select one of the of the WUR Frames 2501, 205-2 or 250-3 to process in the manner previously described.

Although the WUR data unit 600 is shown as having three concurrent WUR Frames 250-1, 250-2, 250-3 appended to legacy preamble 210, the data unit 600 could include more or less than three WUR frames. In some embodiments, the number of WUR frames appended to legacy preamble 210 may be configurable. In some embodiments the bandwidth of the WUR frames and guard bands between them, and their frequency assignment within the bandwidth of legacy preamble 210 could be configurable.

The present disclosure may provide certain example algorithms and calculations for implementing examples of the disclosed methods and systems. However, the present disclosure is not bound by any particular algorithm or calculation.

Although the present disclosure may describe methods and processes with steps in a certain order, one or more steps of the methods and processes may be omitted or altered as appropriate. One or more steps may take place in an order other than that in which they are described, as appropriate.

While the present disclosure may be described, at least in part, in terms of methods, a person of ordinary skill in the art will understand that the present disclosure is also directed to the various components for performing at least some of the aspects and features of the described methods, be it by way of hardware components, software or any combination of the two.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method of providing a wake-up signal in a communications channel, comprising:
   generating a series of waveform coded symbols that each represent a corresponding data bit from a wake-up frame, each of the waveform coded symbols comprising a guard interval followed by first and second sub-symbols of equal duration wherein the corresponding data bit is represented as a different relative energy distribution between the first and second sub-symbols, wherein generating the series of waveform coded symbols comprises applying time domain waveform coding to a series of identical multi-carrier modulated symbols, and the multi-carrier modulated symbols have a subcarrier spacing that is equal to or greater than an inverse of the total combined duration of the first and second sub-symbols of the waveform coded symbols;
   modulating the waveform coded symbols onto a carrier frequency and transmitting a wake-up signal that includes the modulated waveform coded symbols in the communications channel.

2. The method of claim 1 wherein the data bits are coded using on-off keying to represent data bits, wherein a first data bit value is represented by a waveform coded symbol with the first sub-symbol having higher energy than the second sub-symbol, and a second data bit value is represented by a waveform coded symbol with the first sub-symbol having lower energy than the second sub-symbol.

3. The method of claim 2 wherein the sub-symbol having the lower energy has substantially zero energy.

4. The method of claim 1 wherein the guard interval of each waveform coded symbol has substantially zero energy.

5. The method of claim 1 wherein the guard interval of each waveform coded symbol is a cyclic prefix copied from a trailing portion of a symbol used to generate the waveform coded symbol.

6. The method of claim 1 wherein the guard interval of each waveform coded symbol has a duration that is ¼ of a total combined duration of the first and second sub-symbols, and each waveform coded symbol has a duration of 4 µs, each guard interval has a duration of 0.8 µs, and each sub-symbol has a duration of 1.6 µs.

7. The method of claim 1 wherein the guard interval of each waveform coded symbol has a duration that is 1/10 of a total duration of the waveform coded symbol, and each waveform coded symbol has a duration of 8 µs, each guard interval has a duration of 0.8 µs, and each sub-symbol has a duration of 3.6 µs.

8. The method of claim 1 wherein each multi-carrier modulated symbol comprises a set of subcarriers in which alternating subcarriers are set to one and zero respectively.

9. The method of 8 wherein the set of subcarriers is centrally located in a larger group of subcarriers that make up the multi-carrier modulated symbol.

10. The method of claim 9 wherein the larger group of subcarriers consists of 64 subcarriers, and the set of subcarriers includes 14 subcarriers of which 7 are set to one, and the sub-carriers have an inter-carrier spacing of 312.5 KHz.

11. The method of claim 1 comprising:
   generating a plurality of series of the waveform coded symbols, each series representing a respective wake-up frame;
   wherein the wake-up signal has a predefined bandwidth and each series is assigned a respective sub-band within the predefined bandwidth, the transmitted wake-up signal simultaneously including the plurality of series of the waveform coded symbols.

12. The method of claim 11 wherein the plurality of series of the waveform coded symbols are appended to a legacy preamble symbol that occupies the predefined bandwidth.

13. The method of claim 11 wherein each series of waveform coded symbols comprises multicarrier modulated symbols having a uniform subcarrier spacing.

14. The method of claim 13 wherein the predefined bandwidth is 20 MHz, and a total of three series of waveform coded symbols are included in the transmitted wake-up signal, each series having a bandwidth of 5 MHz or less, wherein a frequency guard band is included between adjacent series.

15. The method of claim 14 wherein the frequency guard bands each include at least a single unused subcarrier between the adjacent series.

16. The method of claim 1, further comprising:
   receiving, at the wake up radio circuit, one of the series of waveform coded symbols; and
   comparing, at the wake up radio circuit, the relative energy distribution between the first and second sub-symbols of each waveform coded symbol to determine if the waveform coded symbol represents a data bit "1" or a data "bit "0" to generate a recovered wake-up frame.

17. A transmitter for providing a wake-up signal in a communications channel, comprising:
  a waveform coding module configured to generate a series of waveform coded symbols that each represent a corresponding data bit from a wake-up frame, each of the waveform coded symbols comprising a guard interval followed by first and second sub-symbols of equal duration wherein the corresponding data bit is represented as a different relative energy distribution between the first and second sub-symbols, wherein the series of waveform coded symbols are generated by applying time domain waveform coding to a series of identical multi-carrier modulated symbols, and the multi-carrier modulated symbols have a subcarrier spacing that is equal to or greater than an inverse of the total combined duration of the first and second sub-symbols of the waveform coded symbols;
  a modulator for upconverting the waveform coded symbols onto a carrier frequency and transmitting a wake-up signal that includes the modulated waveform coded symbols in the communications channel.

18. The transmitter of claim 17 wherein the data bits are coded using on-off keying to represent data bits, wherein a first data bit value is represented by a waveform coded symbol with the first sub-symbol having higher energy than the second sub-symbol, and a second data bit value is represented by a waveform coded symbol with the first sub-symbol having lower energy than the second sub-symbol.

19. The transmitter of claim 18 wherein the sub-symbol having the lower energy has substantially zero energy.

20. The transmitter of claim 17 wherein each multi-carrier modulated symbol comprises a set of subcarriers in which alternating subcarriers are set to one and zero respectively.

21. The transmitter of claim 20 wherein the set of subcarriers is centrally located in a larger group of subcarriers that make up the multi-carrier modulated symbol.

22. The transmitter of claim 21 wherein the larger group of subcarriers consists of 64 subcarriers, and the set of subcarriers includes 14 subcarriers of which 7 are set to one, and the sub-carriers have an inter-carrier spacing of 312.5 KHz.

23. The transmitter of claim 17 wherein the waveform coding module is configured to generate a plurality of series of the waveform coded symbols, each series representing a respective wake-up frame;
  wherein the wake-up signal has a predefined bandwidth and each series is assigned a respective sub-band within the predefined bandwidth, the transmitted wake-up signal simultaneously including the plurality of series of the waveform coded symbols.

24. The transmitter of claim 23 wherein the predefined bandwidth is 20 MHz, and a total of three series of waveform coded symbols are included in the transmitted wake-up signal, each series having a bandwidth of 5 MHz or less, wherein a frequency guard band is included between adjacent series, and the frequency guard bands each include at least a single unused subcarrier between the adjacent series.

25. A method or receiving a wake-up signal at a receiver comprising a low power wake up radio circuit, comprising:
  receiving, at the wake up radio circuit, a series of waveform coded symbols that each represent a corresponding data bit from a wake-up frame, each of the waveform coded symbols comprising a guard interval followed by first and second sub-symbols of equal duration wherein the corresponding data bit is represented as a different relative energy distribution between the first and second sub-symbols, wherein the series of waveform coded symbols have each been generated by time domain waveform coding of a series of identical multi-carrier modulated symbols, and the multi-carrier modulated symbols have a subcarrier spacing that is equal to or greater than an inverse of the total combined duration of the first and second sub-symbols of the waveform coded symbols;
  comparing, at the wake up radio circuit, the relative energy distribution between the first and second sub-symbols of each waveform coded symbol to determine if the waveform coded symbol represents a data bit "1" or a data "bit "0" to generate a recovered wake-up frame.

26. The method of claim 25 wherein wake up radio circuit comprises a filter for filtering the series of waveform coded symbols prior to comparing the relative energy distribution, the filter having a filtering coefficient of less than 2.

27. A low power wake-up radio receiver circuit comprising:
  a modulator for down converting from a receiving a carrier frequency, a series of waveform coded symbols that each represent a corresponding data bit from a wake-up frame, each of the waveform coded symbols comprising a guard interval followed by first and second sub-symbols of equal duration wherein the corresponding data bit is represented as a different relative energy distribution between the first and second sub-symbols, wherein the series of waveform coded symbols have each been generated by time domain waveform coding of a series of identical multi-carrier modulated symbols, and the multi-carrier modulated symbols have a subcarrier spacing that is equal to or greater than an inverse of the total combined duration of the first and second sub-symbols of the waveform coded symbols;
  power distribution and decision modules for comparing, at the wake up radio circuit, the relative energy distribution between the first and second sub-symbols of each waveform coded symbol to determine if the waveform coded symbol represents a data bit "1" or a data "bit "0" to generate a recovered wake-up frame.

* * * * *